(12) United States Patent
Ou

(10) Patent No.: US 11,555,327 B1
(45) Date of Patent: Jan. 17, 2023

(54) FENCE STAKE

(71) Applicant: Far North International LLC, Joliet, IL (US)

(72) Inventor: Chunlin Ou, Joliet, IL (US)

(73) Assignee: Far North International LLC

( * ) Notice: Subject to any disclaimer, the term of this patent is extended or adjusted under 35 U.S.C. 154(b) by 148 days.

(21) Appl. No.: 17/196,293

(22) Filed: Mar. 9, 2021

(51) Int. Cl.
- *E04H 17/08* (2006.01)
- *E04H 17/00* (2006.01)
- *E04H 17/14* (2006.01)

(52) U.S. Cl.
CPC .............. *E04H 17/08* (2013.01); *E04H 17/00* (2013.01); *E04H 17/006* (2021.01); *E04H 17/1413* (2013.01)

(58) Field of Classification Search
CPC ...................................................... E04H 17/08
See application file for complete search history.

(56) References Cited

U.S. PATENT DOCUMENTS

| | | | | |
|---|---|---|---|---|
| 2,199,518 A | * | 5/1940 | Coleman | E04H 17/24 256/11 |
| 2,923,415 A | * | 2/1960 | Brown | A47F 5/01 211/88.01 |
| 4,540,160 A | * | 9/1985 | Zanavich | E04H 17/1413 256/66 |
| 5,007,587 A | * | 4/1991 | Daroca | B05B 15/622 239/289 |
| 5,029,819 A | * | 7/1991 | Kane | E01F 13/028 160/24 |
| D634,448 S | | 3/2011 | Richmond | |
| D651,721 S | | 1/2012 | Richmond | |
| 8,640,398 B1 | | 2/2014 | Richmond | |
| 2009/0140224 A1 | * | 6/2009 | Ratanasiriwilai | E04H 17/12 256/2 |
| 2014/0076243 A1 | * | 3/2014 | Barzani | E04H 17/22 52/745.12 |
| 2014/0293601 A1 | * | 10/2014 | Beausoleil | F21V 21/088 362/296.07 |
| 2015/0021532 A1 | * | 1/2015 | Smith | E04H 17/22 256/65.01 |

FOREIGN PATENT DOCUMENTS

JP          10060845 A   *   3/1998

* cited by examiner

*Primary Examiner* — Brian D Mattei
*Assistant Examiner* — Omar F Hijaz
(74) *Attorney, Agent, or Firm* — The Law Offices of Konrad Sherinian, LLC; Depeng Bi

(57) ABSTRACT

A fence stake includes a horizontal rod and a plurality of vertical rods attached to the horizontal rod or integrally formed with the horizontal rod. The plurality of vertical rods includes a set of capped rods and a set of capless rods. The set of capped rods and the set of capless rods alternate along the horizontal rod. Each capped rod includes a body portion, a cap tapering into the body portion, and a tapered end. The tapered end of the capped rod is a sharp end in one implementation. The plurality of vertical rods is perpendicular to the horizontal rod. A plurality of vertical rods includes rods of the same length. The rods are in the shape of a cylinder, a prism, a triangular prism or an oval prism, and made of metal or synthetic materials.

8 Claims, 2 Drawing Sheets

ND STAKE

CROSS REFERENCE TO RELATED APPLICATIONS

None.

FIELD OF THE DISCLOSURE

The present invention generally relates to fences, and more particularly relates to a fence stake. More particularly still, the present disclosure relates to a fence stake for securing a wire fence or preventing animal from digging under a wire fence.

DESCRIPTION OF BACKGROUND

A fence is a structure that encloses or helps to enclose an area. A common type of fences is made of metal wires. A fence usually does not incorporate a solid foundation along its length. Instead, it is fixed to posts. The bottom of the fence oftentimes becomes damaged or separated from the ground with a gap. Therefore, there is a need for a fence stage that covers the gap, or repairs or covers the damaged area. In addition, fences usually do not extend into the ground. Animals can thus dig the ground to circumvent the fences. Therefore, there is a need for a fence stake inserted into the ground next to a fence to block the animals from overcoming the fences by going through an underground hole. Still further there is a need for a new fence stake with capped rods.

SUMMARY OF THE DISCLOSURE

Generally speaking, pursuant to the various embodiments, the present disclosure provides a fence stake. The fence stake includes a horizontal rod, and a plurality of vertical rods perpendicularly attached to or integrally formed with the horizontal rod. The plurality of vertical rods includes a set of capped rods and a set of capless rods. Each capped rod within the set of capped rods includes a cap, a body and a tapered end. The cap tapers into the body. The set of capped rods alternates with the set of capless rods along the horizontal rod. Rods within the plurality of vertical rods are of a same length. The tapered end is a sharp end. Rods within the plurality of vertical rods is a metal rod. Each rod within the plurality of vertical rods is a cylinder, a prism, an oval prism or a triangular prism in shape. Each rod within the set of capless rods incorporates a tapered capless rod end. Each rod within the set of capless rods incorporates a sharp capless rod end. The set of capped rods includes more than one capped rod and the set of capless rods includes more than one capless rod. In a further implementation, the fence stake includes a second horizontal rod. The plurality of vertical rods is perpendicularly attached to or integrally formed with the second horizontal rod. The set of capped rods alternating with said set of capless rods along the second horizontal rod.

Further in accordance with the present teachings is a fence stake. The fence stake includes a horizontal rod, and a plurality of vertical rods perpendicularly attached to or integrally formed with the horizontal rod. The plurality of vertical rods includes a set of capped rods and a set of capless rods. Each capped rod within the set of capped rods includes a cap and a body. The cap tapers into the body. Each capped rod within the set of capped rods incorporates a sharp end, a tapered end or a flat end. Each rod within the plurality of vertical rods is a metal rod. The set of capped rods alternates with the set of capless rods along the horizontal rod. Rods within the plurality of vertical rods are of a same length. Each rod within the plurality of vertical rods is a cylinder, a prism, an oval prism or a triangular prism in shape. In a further implementation, the fence stake includes a second horizontal rod. The plurality of vertical rods is perpendicularly attached to or integrally formed with the second horizontal rod.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
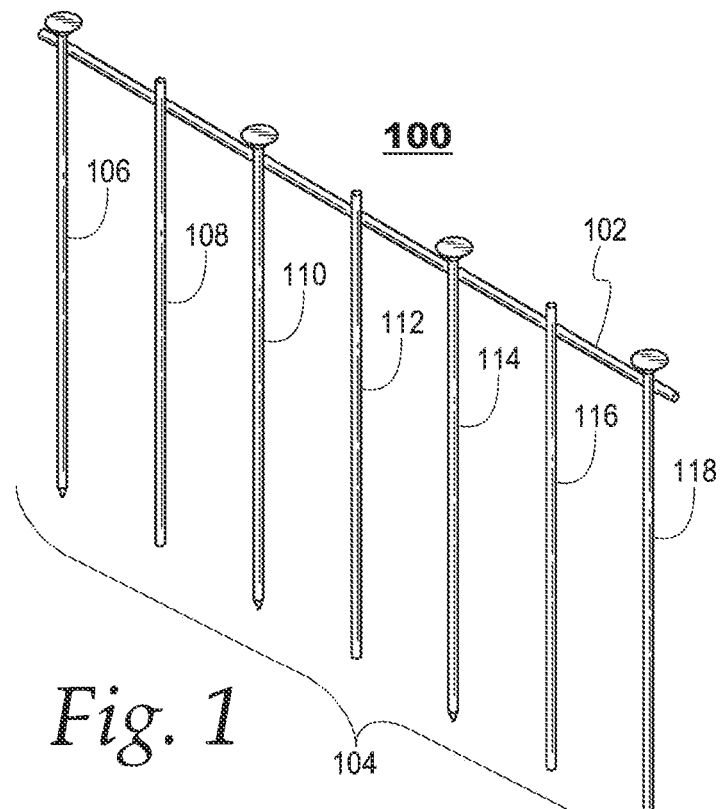
FIG. 1 is a front perspective view of a fence stake in accordance with this disclosure.

Turning to the Figures and to FIG. 1 in particular, a front perspective view of a fence stake is shown and generally indicated at 100. The new fence stake 100 includes a horizontal rod 102 and a plurality of vertical rods 104. The vertical rods 104 are perpendicular or substantially perpendicular to the horizontal rod 102. As used herein, the vertical rods 104 are referred to herein as perpendicularly attached to the horizontal rod 102. The rods 102-104 are made of solid and strong materials, such as steel, iron, aluminum, alloy, synthetic materials, etc. The vertical rods 104 are firm enough to allow the fence state 100 to be inserted into the ground by force.

The plurality of vertical rods 104 includes a set of capless rods, such as those indicated at 108, 112 and 116, and a set (meaning one or more) of capped rods, such as those indicated at 106, 110, 114 and 118. In one implementation, the capless rods and the capped rods alternate between them as shown in FIG. 1. In other words, from the left to the right, a capless rod can only precede a capped rod while a capped rod can only precede a capless rod. The set of capless rods can be constructed in different geometrical shapes, such as cylinder, prism, triangular prism, oval prism, etc., without deviating from the present teachings.

Figure 2:
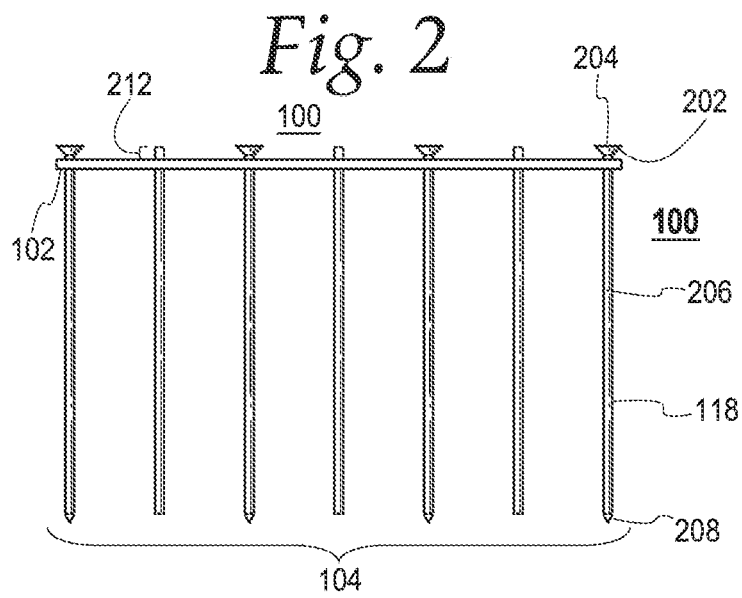
FIG. 2 is a rear view of a fence stake in accordance with this disclosure.

The capped rods are further illustrated in FIG. 2. Referring now to FIG. 2, a rear view of the fence stake 100 is shown. Each capped rod, such as the capped rod 118 includes a cap 202, a body 206 and a capped rod end 208. In one implementation, the cap 202, incorporates a flat top surface 204. The cap 202 tapers downward from the surface 204 into the body 206. The large cap surface 204 allows the fence stage 100 to be hammered downward into the ground without being damaged during the insertion process. The large cap 202 also makes it easier for the installer to apply force on the fence stake 100 during installation. The body portion 206 takes the shape of, for example, a cylinder, a prism, a triangular prism or an oval prism, without deviating from the present teachings. As used herein, the geometrical shape of the body 206 is also said to be the shape of the capped rod 118. The end 208 is tapered downward as well for easier insertion into the ground. The tapered end 208 can be, for example, a semi-sphere, a sharp end like that of a nail, etc.

Figure 3:
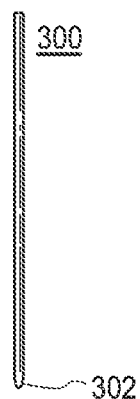
FIG. 3 is a front view of a vertical rod of a fence stake apparatus in accordance with this disclosure.
Figure 4:
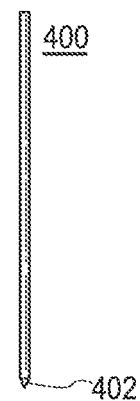
FIG. 4 is a front view of a vertical rod of a fence stake apparatus in accordance with this disclosure.

In an alternate embodiment, the capless rods incorporate tapered ends as well. Turning to FIG. 3, a front side view of a capless rod with a tapered capless rod end 302 is shown and generally indicated at 300. A front side view of a capless rod with a sharp capless rod end 402 is shown and generally indicated at 400 in FIG. 4.

Turning back to FIG. 2, the length of the capless rods above the horizontal rod 102 is less than that below the rod 102. In one implementation, the length of the capless rods above the horizontal rod 102 is close to zero. Alternatively, it is no more than one inch, such as half inches. In one embodiment, the entire length of the capless rods 108, 112 and 116 is approximately twenty-four inches or thirty-two inches, and the distance between two consecutive vertical rods is approximately one and half inches or two and half inches respectively. In one implementation, the rods 104 are of the same length.

In one embodiment, the vertical rods 104 are welded to the horizontal rod 102. Alternatively, they are attached to the horizontal rod 102 via a different attachment mechanism, such as screws.

Figure 5:
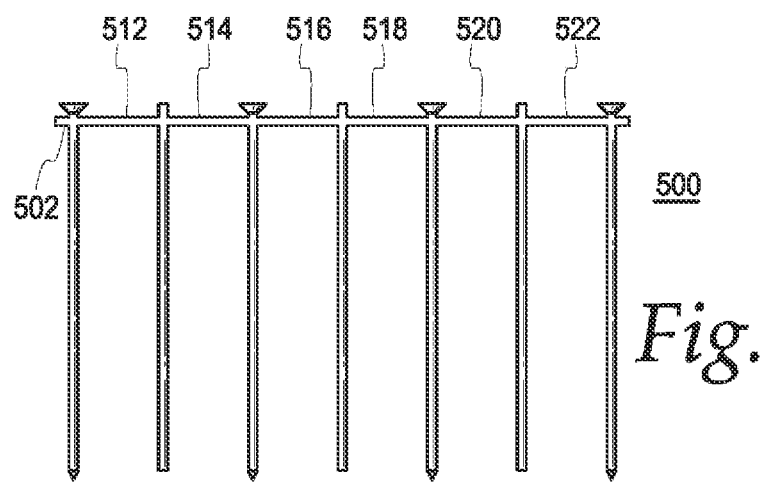
FIG. 5 is a front view of a fence stake apparatus in accordance with this disclosure.

In a different embodiment, the rods 102-104 are integrally formed. The integrally formed fence stake is further illustrated by reference to FIG. 5. Referring to FIG. 5 now, a front view of an integrally formed fence stake is shown and generally indicated at 500. The horizontal rod 502 of the fence stake 500 includes the segments 512-522 disposed between consecutive vertical rods respectively. Whether the vertical rods 104 and 512-522 are integrally formed with or attached to the horizontal rod 102 and 502 respectively, the vertical rods are said to be mounted to the horizontal rod herein.

Figure 6:
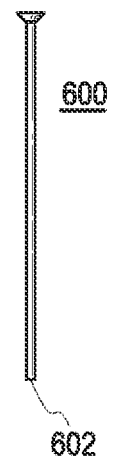
FIG. 6 is a front view of a capped vertical rod of a fence stake in accordance with this disclosure.

Obviously, many additional modifications and variations of the present disclosure are possible in light of the above teachings. Thus, it is to be understood that, within the scope of the appended claims, the disclosure may be practiced otherwise than is specifically described above. For example, as shown in FIG. 6, a capped vertical rod 600 incorporates a flat or substantially flat capped rod end 602. As another example, the vertical rods 104 are evenly distributed along the horizontal rod 102 while they are unevenly distributed in a different implementation.

Figure 7:
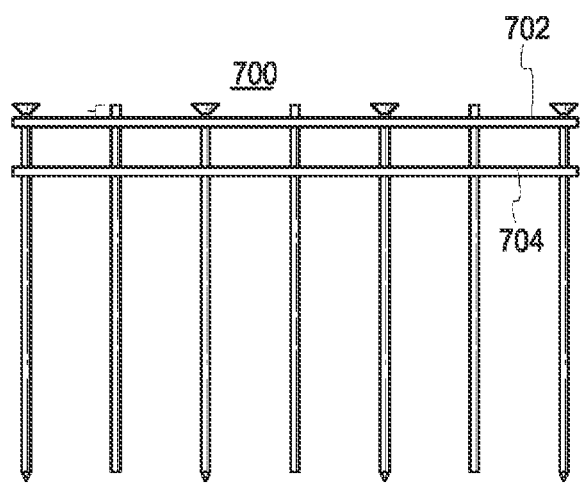
FIG. 7 is a front view of a fence stake in accordance with this disclosure.
Figure 8:
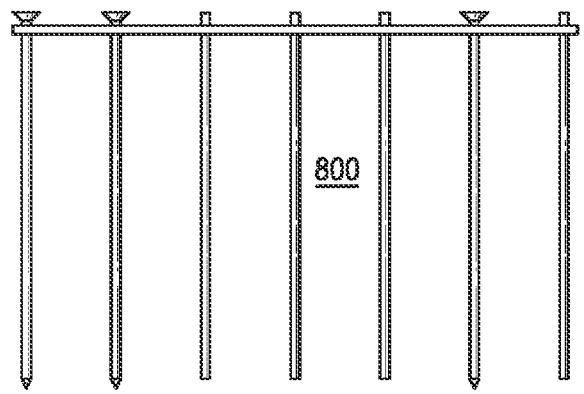
FIG. 8 is a front view of a fence stake in accordance with this disclosure.

As another example, as shown in FIG. 7, a fence stake 700 includes two horizontal rods 702 and 704. As yet another example, as shown in FIG. 8, a fence state 800 includes a set of capless vertical rods and a set of capped vertical rods that are distributed along the horizontal rod in a different manner from that of the fence stake 100.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A fence stake comprising:
   1) a horizontal rod;
   2) a plurality of vertical rods perpendicularly attached to or integrally formed with said horizontal rod, said plurality of vertical rods including a set of capped rods and a set of capless rods, each capped rod within said set of capped rods including a cap, a body and a tapered end, said cap including a top surface, said top surface being flat, said cap having a frustoconical shape tapering downward from said top surface into said body, said cap resting on top of said body, wherein said cap, said body and said tapered end are monolithic;
   3) wherein said set of capped rods alternates with said set of capless rods along said horizontal rod; and
   4) wherein vertical rods within said plurality of vertical rods are of a same length.

2. The fence stake of claim 1, wherein said tapered end is a sharp end.

3. The fence stake of claim 1, wherein each vertical rod within said plurality of vertical rods is a metal rod.

4. The fence stake of claim 1, wherein each vertical rod within said plurality of vertical rods is a cylinder, a prism, an oval prism or a triangular prism in shape.

5. The fence stake of claim 1, wherein each capless rod within said set of capless rods incorporates a tapered capless rod end.

6. The fence stake of claim 1, wherein each capless rod within said set of capless rods incorporates a sharp capless rod end.

7. The fence stake of claim 1, wherein said set of capped rods includes more than one capped rod and said set of capless rods includes more than one capless rod.

8. The fence stake of claim 1 further comprising a second horizontal rod, said plurality of vertical rods perpendicularly attached to or integrally formed with said second horizontal rod, said set of capped rods alternating with said set of capless rods along said second horizontal rod.

* * * * *